Fig. 1

Inventor
ZELIE RIDDLE.

By A.B.Bowman
Attorney

Aug. 31, 1926.

Z. RIDDLE 1,598,506

COMBINATION LOCKING MECHANISM FOR VEHICLES

Filed March 18, 1924     5 Sheets-Sheet 5

Inventor

ZELIE RIDDLE.

By A. B. Bowman

Attorney

Aug. 31, 1926.

Z. RIDDLE 1,598,506

COMBINATION LOCKING MECHANISM FOR VEHICLES

Filed March 18, 1924      5 Sheets-Sheet 5

Inventor

ZELIE RIDDLE.

By A.B.Bowman
Attorney

Patented Aug. 31, 1926.

1,598,506

UNITED STATES PATENT OFFICE.

ZELIE RIDDLE, OF SAN DIEGO, CALIFORNIA, ASSIGNOR, BY MESNE ASSIGNMENTS, OF ONE-HALF TO ANDREW R. BLACKSTONE, OF SAN DIEGO, CALIFORNIA.

COMBINATION LOCKING MECHANISM FOR VEHICLES.

Application filed March 18, 1924. Serial No. 700,015.

My invention relates to a combination locking mechanism, which is particularly adapted to lock the ignition as well as the power transmission mechanism of vehicles, and the objects of my invention are: first, to provide a locking mechanism of this class for vehicles which may be readily operated from the driver's seat for connecting and disconnecting the ignition system of the vehicle with and from a source of electrical energy, and for locking and unlocking the transmission mechanism thereof; second, to provide a locking mechanism of this class whereby the ignition mechanism is connected with a source of electrical energy and the transmission mechanism is unlocked by the shifting of a certain lever in one direction, and whereby the transmission mechanism is automatically locked when the motor is stopped by shifting the lever in the opposite direction; third, to provide a combination locking mechanism, the operation of which is controlled by means of a plurality of plungers or buttons which may be easily adjusted so as to be shifted different distances for providing different combinations for different vehicles, or for the same vehicle at different times as desired; fourth, to provide a novelly constructed coacting plunger means for combination locking mechanisms; fifth, to provide novelly constructed combination plungers and novel means for adjusting the same to change the combination of the locking mechanism; sixth, to provide a novel switch mechanism in connection with a locking mechanism of this class; seventh, to provide novel means for locking the transmission mechanism of the vehicle; eighth, to provide a novel fluid actuated means, which is connected with the pressure oil feed pump of the vehicle, for unlocking the transmission mechanism of the same when the motor is running and for locking said transmission mechanism when the motor is shut off; ninth, to provide an auxiliary switch means operative in connection with the switch mechanism of the locking mechanism for disconnecting the ignition system of the vehicle when coasting down a hill or when desiring to stop the motor temporarily without locking the vehicle; tenth, to provide as a whole a novelly constructed combination locking mechanism, and eleventh, to provide such a locking mechanism which is very simple and economical of construction proportionate to its function, durable, reliable, easy to operate, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the character of reference thereon, which form a part of this application, in which:

Like character of reference refer to similar parts and portions throughout the several views of the drawings.

The plates 1, 2 and 3, plate spacing bolts 4, spacers 5, bolts 6, casing 7, casing retaining screws 8, chamber member 9, cover 10, plunger members 11, tumblers 12, compression springs 13, tumbler adjusting screws 14, tumbler retaining screws 15, adjusting sockets 16, socket retaining screws 17, compression springs 18, cap supporting members 19, cap supporting member positioning screws 20, caps 21, pawl members 22, pivot screws 23, stop screws 24, torsion springs 25, pins 26, supporting plate 27, pin 28, shaft 29, operating handle 30, operating handle positioning plunger 31, plunger spring 32, locking member 33, pin 34, spring 35, switch supporting member 36, connecting switch member 37, lock nuts 38, compression spring 39, switch actuating rod 40, insulating block 41, switch members 42 and 43, screw 44, torsion spring 45, stop pin 46, switch actuating plunger 47, pawl member 48, valve supporting member 49, compression spring 50, conductors 51 and 52, valves 53 and 54, transmission casing 55, transmission locking cylinder member 56, union 57, piston 58, compression spring 59, plate 60, guide rods 61, gear locking member 62, and the dust cap 63, constitute the principal parts and portions of my combination locking mechanism for vehicles.

The portion of my combination locking mechanism which is supported on the dash member of the vehicle consists of a housing through the front end of which extend a plurality of combination lock and switch plungers, and at the front side of which is supported the operating handle. The frame of the housing which encloses the locking mechanism consists of a plurality of plates 1, 2 and 3, spaced from each other and held in spaced relation relatively to each other by means of spacing bolts 4 and spacers 5. The plate 1 is preferably secured to the front side of the dash member of the vehicle by means of bolts 6. Around the plates 2 and 3 is positioned a casing 7 which is secured to said plates by means of screws 8. To the back side of the plate 3 is secured a chamber member 9 in which are positioned the fluid control valves, which will be described later, and at the outer end of which chamber member is provided a cover or cap 10.

Figure 1:
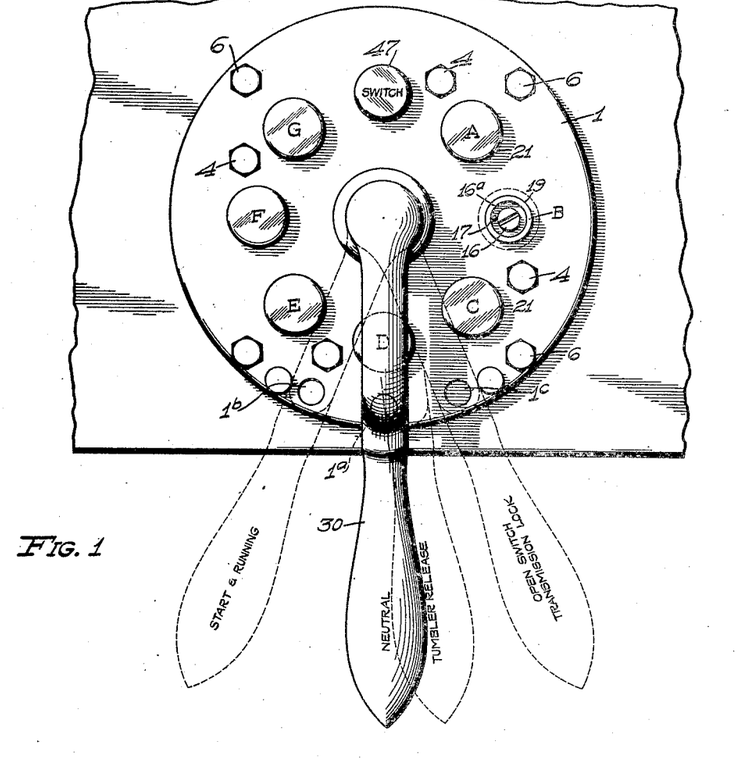
Figure 1 is a front elevational view of my combination locking mechanism secured to the dash member of a vehicle, showing the handle of the locking mechanism by dotted lines in certain shifted positions.
Figures 4, 5, 6:
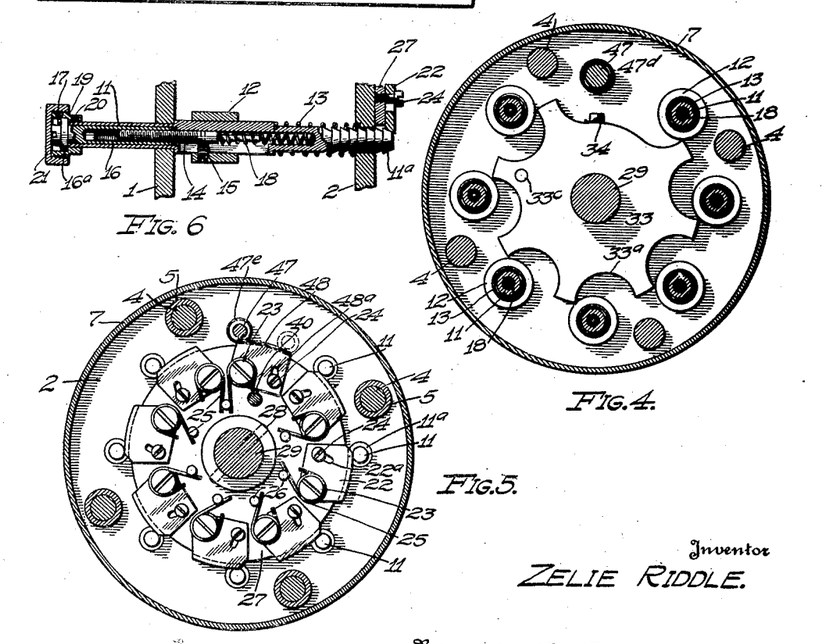
Fig. 4 is another transverse sectional view thereof, taken through 4—4 of Fig. 2.
Fig. 5 is a transverse sectional view thereof, taken through 5—5 of Fig. 2, showing the plunger positioning pawls.
Fig. 6 is a longitudinal sectional view of one of the combination plungers with the section taken through 6—6 of Fig. 2, showing certain parts and portions thereof in elevation to facilitate the illustration.

Through the plates 1 and 2 of the housing frame are reciprocally mounted a plurality of combination plungers, as indicated by A, B, C, D, E, F and G in Fig. 1 of the drawings and as illustrated best in Fig. 6. Each plunger consists mainly of an outer plunger member 11 upon which, and between the plates 1 and 2 of the housing frame, is adjustably mounted a tumbler 12. Around the plunger member 11 is positioned a compression spring 13 for forcing the plunger member in an outward position, the portion of the plunger member 11 upon which the tumbler 12 is mounted being of a larger diameter than the remaining portion thereof, which provides a stop for the outward movement of said plunger member and also a shoulder for the compression spring 13. The plunger members 11 are provided at their inwardly extended ends with a plurality of spaced annular ridges or teeth 11$^a$, which are adapted to engage one side of pawl members 22 when the plunger members are shifted inwardly to certain positions, the inner sides of the teeth and the corresponding engaging edges of the pawl members 22 being so shaped that the plunger members 11 may be easily shifted inwardly past the pawl members when the latter are rotated to a certain position relatively to the former. The tumblers 12, which are adjustably mounted on the plunger members 11, are secured, by means of screws 15, to adjusting screws 14 which are mounted within the members 11. The threaded ends of the screws 14 extend into adjusting sockets 16, which are rotatably mounted within the outer ends of the members 11. The sockets 16 are provided at their outer ends with enlarged heads 16$^a$, which are retained in position in the outer ends of the members 11 by means of socket retaining screws 17, which are positioned in the sides of the cap supporting members 19 secured to the ends of the members 11 by means of screws 20. At the normally inner ends of the adjusting screws 14 are provided compression springs 18, which are adapted to produce friction between the screws 14 and the members 16, and also between the members 16 and the retaining screws 17 to prevent the members 16 from rotating relatively to the adjusting screws 14. On the outer ends of the cap supporting members 19 are provided caps 21 for enclosing the ends of the plunger members 11. It will be here noted that the external and internal threads of the respective members 14 and 16 of each of the plungers A, B, C, D, E, F and G vary in pitch and in direction or hand so that no one but the authorized owner or operator who has the code for his particular combination locking mechanism may adjust or vary the combination of the mechanism intelligently.

The pawl members 22 are pivotally mounted by means of the screws 23 on the plate 27, which is secured to the shaft 29 by means of a pin 28. Around the screws 23 are positioned torsion springs 25, which are retained, at their one end, by the inner edges of the pawl members 22 and which engage, at their other ends, the pins 26 extending outwardly from the plate 27, said springs being adapted to force the pawl members 22 about their pivotal mountings in an outwardly direction against the inner ends of the plunger members 11. The pawl members 22 are provided with arcuate slots $22^a$ concentric with the pivot screws 23, through which slots extend stop screws 24, which are adapted to limit the outward position of said pawl members.

In the housing, preferably at the longitudinal axis thereof, is rotatably mounted the shaft 29, which is retained within the housing by means of the plate 27 previously described. At the end of said shaft, extending in front of the plate 1, is secured a handle member 30, which is provided with a U-shaped portion adapted to extend over and straddle the caps or ends of the plungers, there being provided at the end of the outer leg of the U-shaped portion of the handle member an outwardly extending handle portion, as shown best in Fig. 2. At the portion of the operating handle member 30 near the outer edge of the plate 1 is reciprocally mounted a plunger 31, which is adapted to engage one of three recess portions $1^a$, $1^b$ and $1^c$ when the handle member is positioned respectively in the neutral, running, or the locking position. The plunger 31 is forced outwardly from the handle member by means of a compression spring 32 positioned in the recess in which said plunger is mounted.

Figure 3:
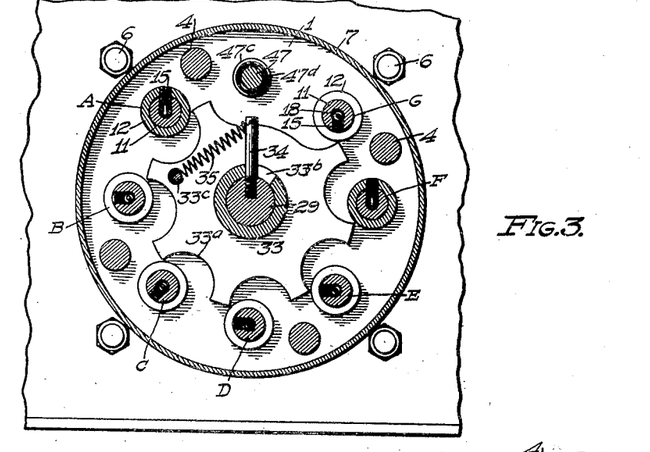
Fig. 3 is a transverse sectional view thereof, taken through 3—3 of Fig. 2, showing the relation of the tumblers and locking member when in a neutral position.

On the shaft 29 between the plates 1 and 2 is shiftably mounted the locking member 33, which is annular and channel shaped, the distance between the flanges forming the channel being slightly greater than the length of the tumblers 12 so that when the plungers are depressed a certain predetermined distance, the tumblers on each are alined transversely with each other between the flanges of the locking member 33, which permits the locking member to rotate and operate the switch mechanism, as will be described later. The flanges of the locking member 33 are provided at their peripheries with a plurality of semicircularly shaped cutaway portions $33^a$, which are adapted to permit the tumblers of the plungers to be shifted past the flanges. It will be noted that when the operating handle member 30 is in the neutral position, the portions of the locking member between the cutaway portions are positioned substantially close to the tumblers 12 so that the handle member may not be shifted toward the starting or running position until the plungers are depressed certain distances, as previously mentioned. The connecting or hub portion of the locking member 33 is provided with a transverse slot $33^b$, through which extends the pin 34, which is secured at its inner end in the shaft 29. Near the outer end of the pin 34 is secured the one end of the tension spring 35, which is secured at its other end to a pin $33^c$ extending between the flanges of the locking member, as shown best in Fig. 3, said spring being adapted to retain the locking member against the pin 34 at the slotted portion in the hub thereof.

Figures 7, 8, 9, 10, 11:
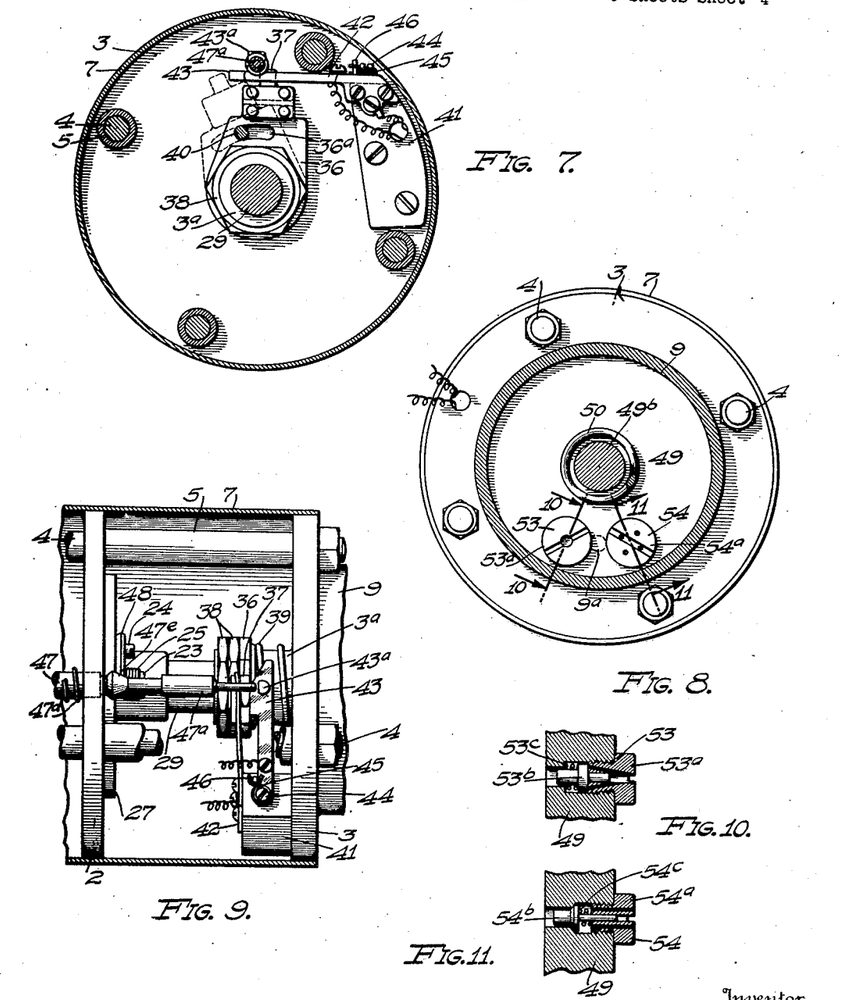
Fig. 7 is a transverse sectional view of the locking mechanism, with the section taken through 7—7 of Fig. 2, showing by solid lines the switch means shifted to a certain operative position and showing by dotted lines the same in a neutral position.
Fig. 8 is another transverse sectional view thereof, showing the fluid chamber and the valves for controlling the flow of fluid to the transmission mechanism of the vehicle for locking and unlocking the same.
Fig. 9 is a side elevational view of the switch mechanism of my combination locking mechanism.
Fig. 10 is a longitudinal sectional view of the valve for controlling the flow of fluid to the apparatus connected with the vehicle transmission mechanism, with the section thereof taken through 10—10 of Fig. 8.
Fig. 11 is a longitudinal sectional view of the valve for controlling the flow of fluid from said apparatus, with the section taken through 11—11 of Fig. 8.

On the inner side of the plate 3 is provided a lug $3^a$ into which the inner end of the shaft 29 extends. On said lug is rotatably mounted a switch supporting member 36, at the outer end of which is supported a connecting switch member 37, which is insulated from the switch supporting member 36. At the outer end of the lug $3^a$ are provided a pair of lock nuts 38 against which the switch supporting member 36 is frictionally positioned by means of a compression spring 39, positioned around said lug between said switch positioning member and the main portion of the plate 3. On the plate 27, secured to the shaft 29, is provided an outwardly extending switch actuating rod 40, which extends into and is shiftable in an arcuate slot $36^a$ in the switch supporting member 36. The switch member 37 and its support 36, shown by solid lines in Fig. 7 of the drawings, are in the contacting position with the other switch members, which is the position of the switch member when the operating handle member is shifted counter-clockwise to the starting or running position, as indicated by dotted lines in Fig. 1 of the drawings. The position of the switch member and its support, shown by dotted lines in Fig. 7, is the position when the operating handle member is in the locking position or in the neutral position when shifted from the locking position, as shown respectively by the dotted lines of the operating handle member in the extreme right position and by solid lines in Fig. 1 of the drawings. When the operating handle member is in the neutral position, the actuating rod 40 is in the position shown in Fig. 7 of the drawings.

On the inside face of the plate 3 is secured an insulating block 41, on the inner side of which is secured a flexible switch member 42, which is connected with the one terminal of a source of electrical energy. Another switch member 43 is pivotally mounted by means of a screw 44 at the end of the insulating block 41 and is adapted to be retained in a position with its end contiguous to the outer end of the switch member 42 by means of a torsion spring 45, the one end of which is positioned in engagement with a stop pin 46, which pin also serves as a stop for the movement of the switch member 43 toward the other switch member. The outer end of the connecting switch member 37 is adapted to be positioned between the ends of the switch members 42 and 43 when the operating handle is shifted to the starting or running position. Both of the switch members 42 and 43 are preferably bent outwardly or beveled at their adjacent outer ends to facilitate the introduction of the connecting switch member 37 therebetween.

Figure 2:
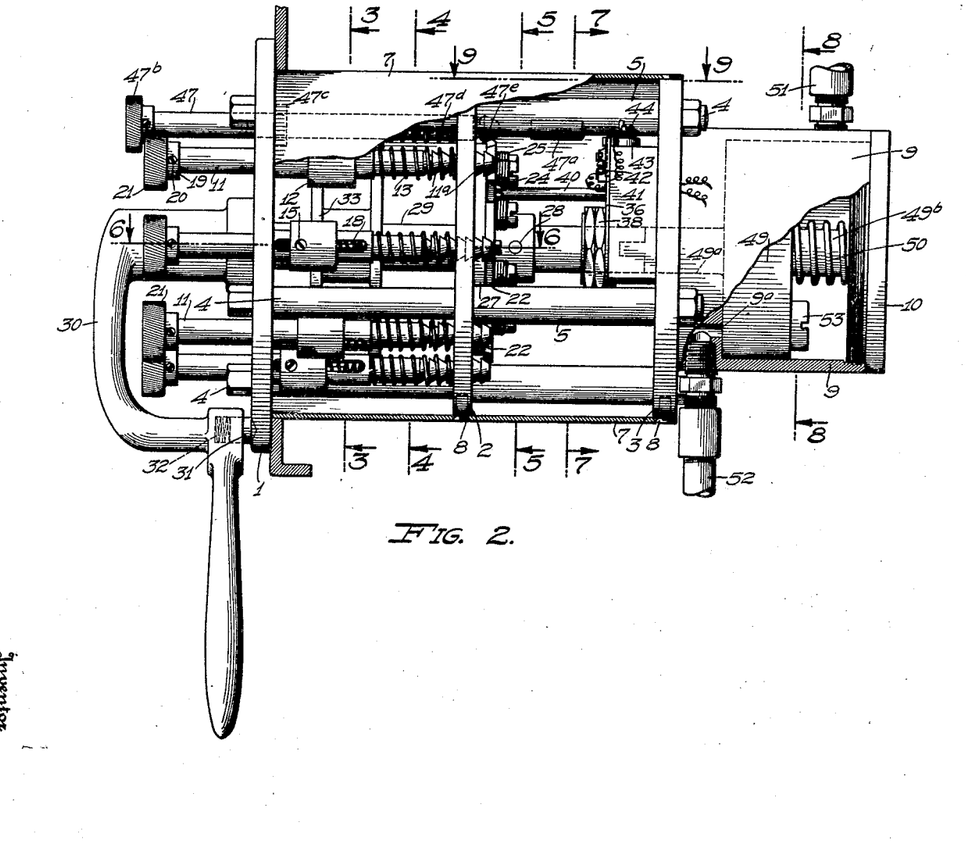
Fig. 2 is a side elevational view thereof, showing certain parts and portions thereof broken away and in section to facilitate the illustration.

On the outer side of the pivotally mounted switch member 43 is provided a lug 43$^a$ which is adapted to be engaged by the insulating tip 47$^a$ of the auxiliary switch actuating plunger 47, which is reciprocally mounted in and extends to either side of the plates 1 and 2, there being provided a button 47$^b$ at the outwardly extended end of said plunger. On the plunger 47 is provided a collar 47$^c$, which serves as a stop for the outward movement of said plunger and which also serves as a shoulder for the compression spring 47$^d$, positioned between the same and the one side of the plate 2, which spring is adapted to force said plunger in an outward position. Between the end of the plunger 47, on which the insulating tip is secured, and the portion mounted in the plate 2, is provided an enlarged portion 47$^a$, which is tapered at both ends, the end toward the switch members being of a more gradual taper than the other end, substantially as shown in Figs. 2 and 9 of the drawings. On the plate 27, on which the pawl members 22 are pivotally mounted is also mounted another pawl member 48 by means of a screw 23. Said pawl member 48 is adapted to be shifted in the opposite direction about its pivotal mounting from the other pawl members. Said pawl member 48 is also adapted to be forced outwardly and limited in its outward movement by the stop screw 24 extending through the slot 48$^a$ therein, substantially as described in connection with the other pawl members. It will be here noted that when the operating handle member is in the running position, the plate 27 is rotated so that the enlarged portion of the switch actuating plunger 47 is in a yieldable position relatively to the pawl member 48, as shown by dotted lines of the plunger in Fig. 5 of the drawings. When desiring to shut off the motor, but not to lock the same, the plunger 47 is pushed inwardly. When said plunger is depressed, the gradually tapered end of the enlarged portion of the plunger in engagement with the pawl member 48 shifts said pawl member about its pivotal mounting and permits the more abruptly tapered end of said enlarged portion to frictionally engage the other beveled sides of said pawl member. The edge of the pawl member 48 in engagement with the plunger 47 is beveled in opposite directions in such a manner that the plunger may be shifted inwardly more easily than in the opposite direction, thus permitting the switch member 43 to be disengaged from the connecting switch member 37 until the plunger 47 is drawn outwardly.

It will be here noted that the portion between the semicircular cutaway portion of the locking member 33 is cut away on the one side contiguous to the switch actuating plunger 47 so that the same will not interfere with said plunger when the locking member is rotated.

In the chamber member 9, secured to the back side of the plate 3, is rotatably mounted a disc-shaped sealing and valve supporting member 49, which is ground on its inner face, which ground face is positioned in engagement with the ground bottom surface of the chamber member 9. On the opposite sides of the member 49, and concentric therewith, are provided outwardly extending lugs 49$^a$ and 49$^b$, the former lug 49$^a$ being adapted to interlock with the inner end of the shaft 29 whereby the member 49 is rotated with said shaft. The other lug 49$^b$ serves as a support for the compression spring 50, which is positioned between the main portion of the member 49 and the cover 10 for forcing the ground surfaces of the member 49 and the bottom surface of the chamber member 9 in engagement with each other. Through the outer wall of said chamber member is tapped a conductor 51, which is connected with the oil pump of the vehicle, and which communicates with said chamber member between the member 49 and the cover 10. Another oil conductor 52 is tapped into the side wall of the chamber member 9 and is adapted to communicate by means of a port 9$^a$ with the back side or ground surface of the sealing and valve supporting member 49, substantially as shown in Fig. 2. In the member 49 are provided two valves 53 and 54, the former being adapted to connect the conductor 51 with the conductor 52 and force oil or other fluid into the latter conductor when the motor is running and when the operating handle member is shifted to the running position, as shown best in Figs. 8 and 10 of the drawings. The other valve 54 is adapted to permit the oil or other fluid in the conductor 52 to be released or forced into the chamber between the member 49 and the cover 10 when the operating handle member is shifted to the locking position. The valve 53 consists of a plug 53ª provided with a central hole, a valve member 53ᵇ positioned with its sealing portion against the inner end of the plug 53ª, and a compression spring 53ᶜ positioned between the shoulder of the recess for the valve and the opposite side of the valve member. The valve 54 is similarly constructed except that the valve member 54ᵇ is seated against the shoulder in the recess for the valve and the compression spring 54ᶜ is positioned between the valve member and the inner end of the valve plug 54ª.

Figure 12:
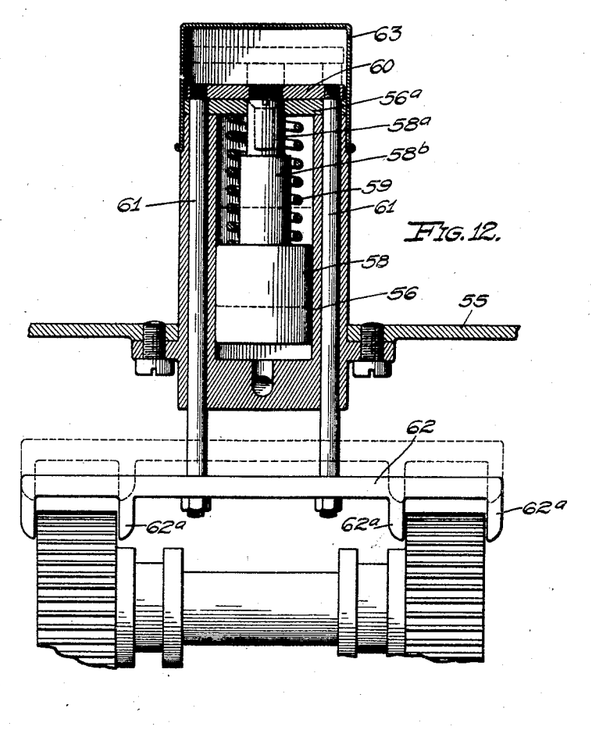
Fig. 12 is a longitudinal sectional view of the apparatus in connection with the transmission mechanism of the vehicle for locking and unlocking the same, with the section thereof taken through 12—12 of Fig. 13.
Figure 13:
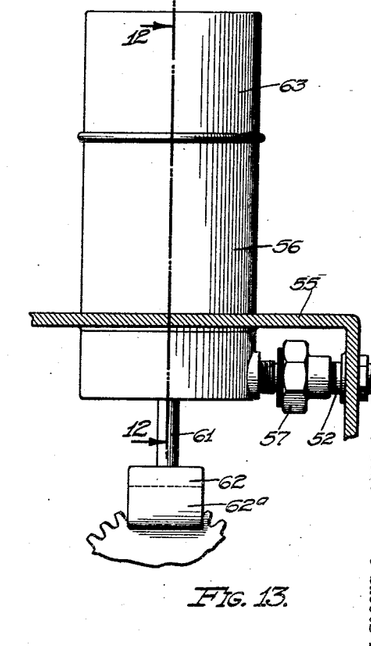
Fig. 13 is a side elevational view of said apparatus, with the view taken at a right angle to that of Fig. 12.

The opposite end of the conductor 52 extends through the transmission casing 55 of the vehicle and is connected by means of a union 57, positioned within the transmission casing, to the lower end of the transmission locking cylinder member 56, which extends through the transmission casing and is secured thereto from the inner side of said casing. Within the cylinder 56 is reciprocally mounted a piston 58, which is adapted to be held in a downward or inward position by means of a compression spring 59, which is positioned between an enlarged portion 58ᵇ of the outwardly extending shank of the piston and the cylinder head 56ª at the outer end of the cylinder member. The outer end of the shank 58ª of the piston extends through the head 56ª, to the outer end of which shank is secured a plate 60, which serves as a stop for the inward movement of the piston. The enlarged portion 58ᵇ of the shank of the piston serves as a stop for the outward movement of the same. Within the cylinder member 56 and to either side of the piston mounted therein are reciprocally mounted a pair of guide rods 61, which are secured at their outer ends to the plate 60 and are reciprocated with the piston. The rods 61 extend beyond the inner end of the cylinder member 56 and are secured at their inner ends to the gear locking member 62, which consists preferably of a bar provided with downwardly extending lugs 62ª, which are adapted to straddle the shiftable gears of the transmission mechanism, as shown best in Fig. 12. At the upper end of the cylinder member 56 is provided a dust cap 63, which prevents dust, dirt and the like from becoming lodged between the plate 60 and the heads 56ª of the cylinder member.

It will be seen that when the operating handle is shifted to the running position the fluid from the conductor 51, forced into the conductor 52, raises or forces the piston 58 outwardly, which shifts the lugs 62ª from the sides of the gears of the transmission mechanism, thus permitting shifting of the gears.

When desiring to unlock and start the automobile, the operator depresses certain or all of the plungers 11 a specified number of notches, depending upon the combination of the locking mechanism, until all of the tumblers 12 are in transverse alinement with each other and between the flanges of the locking member 33. The operating handle member is then adapted to be shifted clockwise to the starting or running position, which shifts the connecting switch member 37 in engagement with the two switch members 42 and 43, thus completing the electric circuit for the ignition mechanism. With the shifting of the operating handle, as stated, the valve 53 is alined with the port 9ª in the chamber member 9, which permits the oil or other fluid under pressure from the conductor 51 to be forced into the conductor 52, which unlocks the transmission mechanism. If it is desired to shut off the engine temporarily, the plunger 47 is depressed, and drawn outwardly again if it is desired to start the engine. When desiring to lock the automobile, the operating handle member is shifted counter-clockwise to the locking position, the neutral position shutting off the flow of fluid to the conductor 52 but permits the engine to run, while the shifting of the handle member to the locking position automatically trips the plungers 11 by reason of the disengagement of the ends of said plungers from the pawl members 22, automatically disconnects the ignition mechanism from the source of electrical energy, and also permits the fluid in the conductor 52 to be released, which automatically permits the compression spring 59 to force the piston 58 inwardly in its cylinder and lock the transmission mechanism.

It is obvious from this construction, as illustrated in the drawings and disclosed in the foregoing specification, that there is provided a combination locking mechanism for vehicles which is automatic in its action, and that there is provided a combination locking mechanism as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In a locking mechanism, a frame, a locking means mounted therein, an operating member shiftably mounted in said frame and releasable by said locking means, a fluid-controlled power transmission locking means, a fluid reservoir connected with a source of fluid under pressure, and valve means in connection with said reservoir, said valve means being operatively connected with said operating member for connecting said reservoir with said power transmission locking means when said operating member is shifted into an operative position.

2. In a locking mechanism, a frame, a plurality of tumblers mounted in said frame and shiftable at different distances therein, an operating means shiftably mounted in said frame in connection with said tumblers, locking means in connection with a power transmission mechanism, and fluid pressure means actuated by said operating means for controlling the movement of said locking means relatively to said transmission mechanism.

3. In a locking mechanism, a tumbler locking means, an operating means in connection therewith, a gear shift locking means in connection with a transmission mechanism, and a fluid pressure actuated means in connection with said operating means and said gear shift locking means whereby the latter is actuated with the shifting of the former.

4. In a vehicle locking mechanism, a tumbler locking means, an operating means in connection therewith, a gear shift locking means in connection with the transmission mechanism of the vehicle, a fluid pressure actuated means in connection with said operating means and said gear shift locking means whereby the latter is actuated with the shifting of the former, and a switch means in connection with said operating means whereby said switch means is actuated by the shifting of said operating means simultaneously with the actuating of said locking means of the transmission mechanism.

5. In a combination locking mechanism for vehicles, a frame, a plurality of plungers reciprocally mounted therein, said plungers being provided with tumblers and with means for retaining said plungers in certain shifted positions, shiftable plunger retaining means positioned within said frame and adapted to engage the retaining means of said plungers, a handle means shiftably mounted on said frame, a locking means in connection with said handle means for engaging said tumblers and adapted to be shifted relatively thereto when said tumblers are shifted to certain positions, a switch means in connection with said handle means adapted to be actuated by said handle means when said tumblers are shifted to said certain positions, and locking means in connection with the transmission mechanism of the vehicle and said handle means whereby said locking means is simultaneously actuated with said switch means.

6. In a combination locking mechanism for vehicles, a frame, a plurality of plungers reciprocally mounted therein, said plungers being provided with tumblers and with means for retaining said plungers in certain shifted positions, shiftable plunger retaining means positioned within said frame and adapted to engage the retaining means of said plungers, a handle means shiftably mounted on said frame, a locking means in connection with said handle means for engaging said tumblers and adapted to be shifted relatively thereto when said tumblers are shifted to certain positions, a switch means in connection with said handle means adapted to be actuated by said handle means when said tumblers are shifted to said certain positions, and fluid actuated locking means in connection with the transmission mechanism of the vehicle actuated by the shifting of said handle means simultaneously with the operation of said switch means.

7. In a combination locking mechanism, a frame, a plurality of plungers reciprocally mounted therein, said plungers being provided with tumblers and with means for retaining said plungers in certain shifted positions, shiftable plunger retaining means positioned within said frame and adapted to engage the retaining means of said plungers, a handle means shiftably mounted on said frame, a locking means in connection with said handle means for engaging said tumblers and adapted to be shifted relatively thereto when said tumblers are shifted to certain positions, a switch means in connection with said handle means adapted to be actuated thereby when said tumblers are shifted to said certain positions, and an auxiliary plunger in connection with said switch means for shifting one of the switch members thereof when the same is in a contacting position with the other switch member of said switch means.

8. In a locking mechanism, a frame, a locking means mounted therein, an operating member shiftably mounted in said frame and releasable by said locking means, a fluid-controlled power transmission locking means, a fluid reservoir connected with a source of fluid under pressure, and valve means in connection with said reservoir, said valve means comprising a rotatable valve member operatively connected with said operating member, and a pair of oppositely directed check valves mounted in said valve member and communicating with said reservoir, said valves being so arranged that when the operating member is shifted to one extreme position one of the valves connects the reservoir with the transmission locking means and when the operating member is shifted to the opposite extreme position the other valve connects the transmission locking mechanism in the opposite direction with the reservoir.

9. In a locking mechanism, a tumbler locking means, an operating means in connection therewith, a locking means in connection with a power transmission mechanism, means in connection with said operating means and said last mentioned locking means for operating the latter with the shifting of the former, a switch means in connection with said operating means adapted to be actuated thereby, and a plunger in connection with said switch means for independently shifting one of the switch members thereof when the same is in a contacting position with another switch member of said switch means.

10. In a locking mechanism, a frame, a locking means mounted therein, an operating member shiftably mounted in said frame and releasable by said locking means, a fluid-controlled locking means comprising a cylinder, a plunger and a locking member operatively connected with said plunger, a fluid reservoir connected with a source of fluid under pressure, a conductor connecting the cylinder of said fluid controlled locking means with said reservoir, and a valve means comprising a valve member rotatably mounted in said reservoir and operatively connected with said operating member, and a pair of oppositely directed check valves mounted in said valve member and communicating at all time with said reservoir, one of said valves being adapted to connect said reservoir with said conductor when the operating member is shifted to one position, and the other valve being adapted to connect said conductor with said reservoir when said operating member is shifted to another position.

11. In a combination locking mechanism, a frame, a plurality of plungers reciprocally mounted therein, means for retaining said plungers in their inwardlly shifted positions, an operating member shiftably mounted in said frame releasable by the inward shifting of certain of said plungers, a switch means in connection with said operating member adapted to be actuated thereby, an auxiliary plunger in connection with said switch means for shifting one of the switch members thereof when the same is in a contacting position with respect to another switch member of said switch means, a locking means in connection with a power transmission mechanism, and means in connection with said operating member and said locking means for operating the latter with the shifting of the former simultaneously with the actuating of said switch means by said operating member.

12. In a combination locking mechanism, a frame, a plurality of plungers reciprocally mounted therein, an operating member shiftably mounted in said frame and releasable by the inward shifting of certain of said plungers, a switch means in connection with said operating member adapted to be actuated thereby, and an auxiliary plunger in connection with said switch means for independently shifting one of the switch members thereof when the same is in a contacting position with respect to another switch member of said switch means.

13. In a combination locking mechanism, a frame, a locking means mounted therein, an operating member shiftably mounted in said frame and releasable by the locking means, and a switch means comprising a pair of spaced apart switch members supported by said frame, one of said switch members being yieldably supported, a connecting switch member carried by said operating member for connecting said first mentioned switch members when said operating member is released, and means engageable with the yieldably supported switch member for shifting the latter in a disengaged position relatively to said connecting switch member.

14. In a combination locking mechanism, a frame, a plurality of plungers reciprocally mounted therein, an operating member shiftably mounted in said frame and releasable by the inward shifting of certain of said plungers, a switch means comprising a pair of spaced apart switch members supported by said frame, one of said switch members being yieldably supported, and a connecting switch member carried by said operating member for connecting said first mentioned switch members when said operating member is released, and an auxiliary plunger reciprocally mounted in said frame adapted to engage said yieldably mounted switch member and disengage the same from the switch member carried by said operating member.

In testimony whereof, I have hereunto set my hand at San Diego, California, this 12th day of March, 1924.

ZELIE RIDDLE.